Dec. 18, 1962
R. D. RANDALL
3,069,126
CONTROL VALVE FOR REGULATING THE FLOW
OF LIMITED QUANTITIES OF FLUID
Filed Sept. 5, 1961
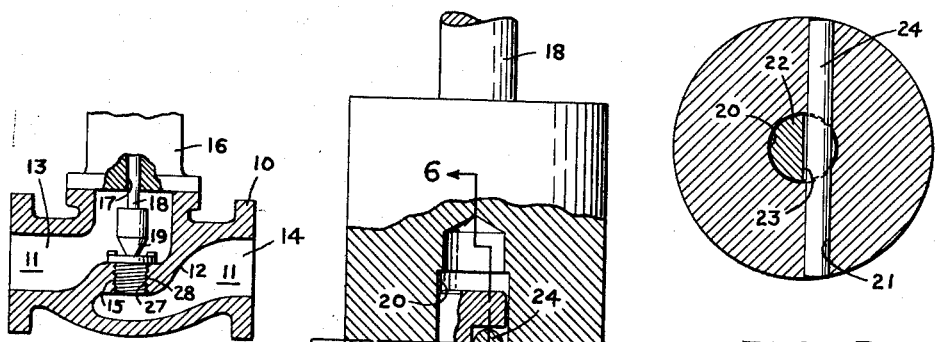
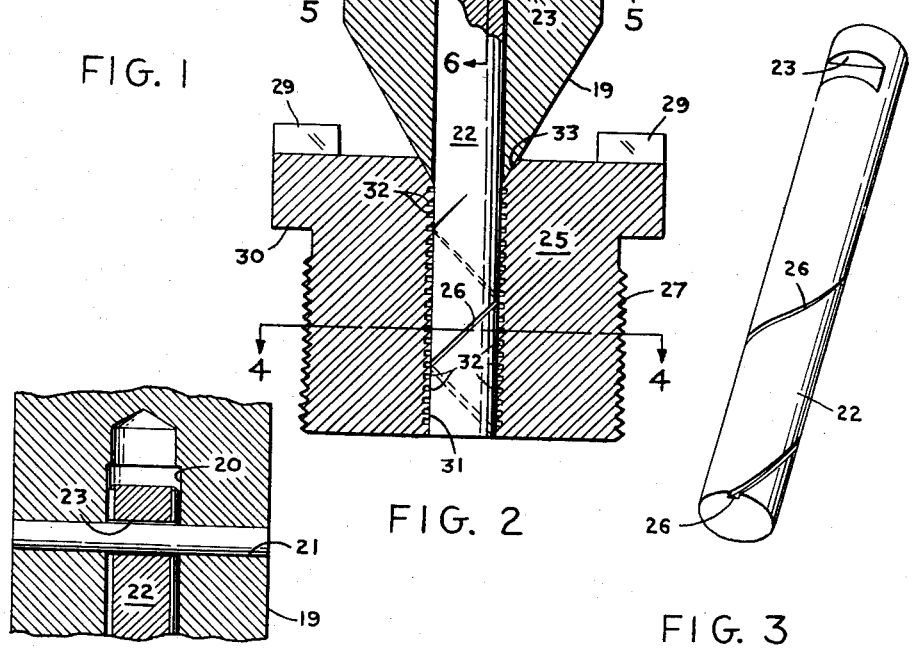
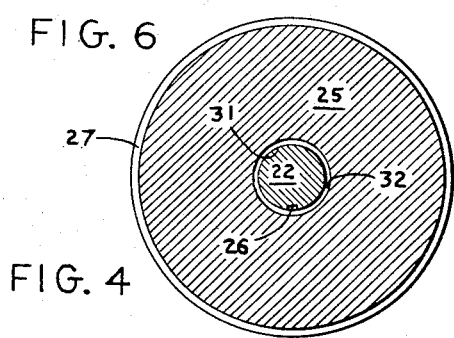
ROSS D. RANDALL
INVENTOR.
BY Daniel W. Bobis
atty United States Patent Office 3,069,126
Patented Dec. 18, 1962

3,069,126
CONTROL VALVE FOR REGULATING THE FLOW OF LIMITED QUANTITIES OF FLUID
Ross D. Randall, Whittier, Calif., assignor to Worthington Corporation, Harrison, N.J., a corporation of Delaware
Filed Sept. 5, 1961, Ser. No. 136,036
1 Claim. (Cl. 251—121)

This invention relates generally to control valves. More particularly the invention relates to control valves which regulate the flow of limited quantities of fluid therethrough.

There are many operations in laboratories, pilot plants and process applications in which limited quantities of fluid are required. In some instances it is desirable to utilize conventional control valve structure and operation with the valve head and port modified to provide limited flow of fluid through the valve. However, when utilizing this modified conventional control valve for limited fluid flow the valve stem travel is so limited that in those applications where the quantity of flow is a critical factor, flow adjustment difficulties inevitably result.

The use of conventional control valves to regulate limited quantities of fluid therethrough is well known in the art. In the past conventional control valves have been adapted to provide limited quantity flow by modifying either the valve stem or the valve seat. However, regardless of how the modification was made more problems were created than solved.

A common difficulty encountered in the use of conventional control valves to regulate the flow of limited quantities of fluid was that of leakage caused by improper fit and alignment of the valve stem to the valve seat.

Another difficulty arising in the use of conventional control valves to regulate the flow of limited quantities of fluid was that the valve stem's close fit to the valve seat caused binding and scoring of the valve seat.

In accordance with the present invention a control valve to regulate the flow of limited quantities of fluid therethrough is provided and includes a housing having a fluid passage which is divided into an upstream side and a downstream side by a transverse partition. The transverse partition has a port formed therein. A valve stem is slidably disposed in the housing in substantial alignment with the port and is connected to means for activating the valve stem to engage and disengage the port. A pin is mounted in the valve stem adjacent the port and slidably disposed therein. The pin is mounted in the valve stem by means which permit free alignment of the pin in the port. Also the pin has means thereon which are in operative association with the port and which regulate the passage of fluid from the upstream side to the downstream side of the fluid passage.

One of the objects of this invention is to provide a control valve to regulate the flow of limited quantities of fluid therethrough.

Another object of this invention is to provide a control valve having normal or standard travel of the valve stem to regulate the flow of limited quantities of fluid therethrough.

Another object of this invention is to provide a control valve having a self aligning seating arrangement to form a binding free close fit to limit leakage and reduce maintenance.

Still another object of this invention is to provide a control valve having a seating arrangement free from scoring.

With these and other objects in view, as may appear from the accompanying specification, the invention consists of various features of construction and combination of parts which will be first described in connection with the accompanying drawings, showing a control valve of a preferred form embodying the invention and the features forming the invention will be specifically pointed out in the claim.

In the drawings:
FIGURE 1 is a side elevation of a control valve shown partly in section.
FIGURE 2 is an enlarged vertical section of the valve structure comprising the invention.
FIGURE 3 is a perspective view of the valve pin showing the spiral groove.
FIGURE 4 is a section taken on line 4—4 of FIGURE 2.
FIGURE 5 is a section taken on line 5—5 of FIGURE 2.
FIGURE 6 is a section taken on line 6—6 of FIGURE 2.

Referring more particularly to the drawings, FIGURE 1 shows the control valve comprising a housing 10 having a fluid passage 11 therein. A transverse partition 12 in the housing 10 divides the fluid passage 11 into an upstream side 13 and a downstream side 14. A port 15 is disposed in the partition 12 through which the upstream side 13 communicates with the downstream side 14.

The housing 10 has a bonnet 16 in fixed relationship thereto being provided by suitable connecting means such as bolts. The bonnet is provided with a bore 17 in substantial axial alignment with the port 15. A valve stem 18 is slidably disposed in the bore 17 and is connected to actuating means (not shown) which cause the valve stem 18 to engage and disengage the port 15. The actuating means do not comprise the present invention and as they are well known in the art are not shown, but it is understood any suitable one may be used.

The valve stem 18 is provided with a conical tip 19 having an axial bore 20 extending into the valve stem 18 beyond the conical tip 19 as shown in FIGURE 2. A cross bore 21 is provided above the conical tip 19 of the valve stem 18 in the area having the axial bore 20. The conical tip 19 is formed as an integral part of valve stem 18 but may be made separate therefrom and suitably connected thereto.

A pin 22 having a recess 23 near the upper end is inserted into the bore 20 and connected to the valve stem 18 by means of a retaining plug 24 disposed in the cross bore 21 and passing through the recess 23 of the pin 22 as shown in FIGURES 5 and 6.

Referring to FIGURE 2 it can be seen that the outer diameter of the pin 22 is several thousandths of an inch less than the inner diameter of the bore 20 of the valve stem 18. The difference of the diameters of the pin 22 and the bore 20 will be at least equal to the expected eccentricity of the axis of the valve stem 18 in relation to the axis of the port 15. The fit of the pin 22 in the bore 20 is not affected by the retaining plug 24.

In assembled position the pin 22 will be in slidable engagement with a seat ring 25 as hereinafter described.

Pin 22 is straight and can be ground and lapped to a high degree of accuracy and can conveniently be made of the hardest materials. The pin 22 has a spiral groove 26 starting near the center and increasing in section as it approaches the lower end of the pin 22 as shown in FIGURE 3.

The valve seat 25 as shown in FIGURE 2 having a threaded circumference 27 is received into the threaded portion 28 of the port 15. Lugs 29 formed on the upper annular edge of the valve seat 25 serve to tighten the connection of the valve seat 25 in the port 15. In order to protect the joint and render it leakproof a shoulder 30 of the valve seat 25 covers the joint and is in contacting engagement with the partition 12 immediately surrounding the port 15. A preferred embodiment of the valve seat 25 is shown but it is understood that the valve seat 25 could be formed integrally in the partition 12 or if desired separate may be connected thereto by a welded joint or in any other acceptable manner.

The valve seat 25 is provided with an axial bore 31 having a plurality of annular grooves 32 and a conical seating surface 33 formed in its upper end of substantially the same inclination as the conical tip 19 of the valve stem 18. A preferred depth of valve seat 25 is about four times that of the diameter of the bore 31. The diameter of the bore 31 is made a few millionths of an inch larger than the outer diameter of the pin 22.

*Seating Arrangement*

It is well known in the art that there is never absolute concentricity between the axes of the valve stem 18 and the valve seat 25. To overcome this as aforementioned a clearance at least equal to the expected maximum eccentricity between the valve stem 18 and the valve seat 25 was included in the fit of the pin 22 in the bore 31 of the valve stem 18 and the operation of this clearance is described hereinafter.

Now referring to FIGURE 2, the pin 22 is slidably engaged in the bore 31 of the valve seat 25. This is accomplished without difficulty as the valve stem 18 in which the pin 22 is connected is in substantial alignment with the bore 31 of valve seat 25 and the eccentricity of the valve stem 18 will not cause the pin 22 to bind because of the clearance provision described above.

Because of the relatively loose fit of the pin 22 in bore 20 of valve stem 18 in comparison with the close fit of pin 22 in bore 31 of the valve seat 25, there will be no binding of the pin 22 when the conical tip 19 of valve stem 18 engages the seating surface 33 of the valve seat 25. The conical tip 19 of valve stem 18 is shaped in substantial conformity to the seating surface 33 of valve seat 25 and when engaged therewith a close fitting shut-off is afforded.

The alignment feature described above automatically operates to compensate for the eccentricity of valve stem 18. Accordingly, pin 22 is able to be inserted into the bore 31 of valve seat 25 in true alignment thereto. Also, valve seat 25 remains free from binding and scoring which would have resulted from either pin 22 or valve stem 18 if not for the aligning provision described above.

*Operation*

In operation pin 22 will remain in slidable engagement in bore 31 of valve seat 25. There will be no flow when the conical tip 19 of the valve stem 18 is engaged with the seating surface 33 of valve seat 25. On raising valve stem 18 pin 22 connected therein also raises a like amount; thus the fluid from the upstream side 13 flows through the spiral groove 26 of pin 22 to the downstream side 14.

The grooves 32 of bore 31 in the valve seat 25 cross the spiral groove 26 of pin 22 at an angle and introduce a velocity head loss in the fluid flowing in spiral groove 26 of pin 22 due to the sudden expansion and sudden contraction each time a groove 32 is crossed.

When pin 22 is fully engaged in bore 31 of valve seat 25 the maximum number of grooves 32 will be present in the path of the fluid flow. As the pin is raised out of bore 31 spiral groove 26 of pin 22 provides a shorter fluid flow channel of larger cross section and fewer grooves 32 of the bore 31 are traversed. Accordingly, the fluid flow is defined as a function of valve stem 18 movement with the maximum or minimum fluid flow occurring coincidentally with the greatest or least movement respectively of valve stem 18. Thus, it is clear that normal travel of the valve stem 18 will serve to regulate the flow of limited quantities of fluid from the upstream side 13 of the control valve to the downstream side 14.

It will be understood that this invention is not to be limited to the specific construction or arrangement of parts shown, but that they may be widely modified within the invention defined by the claim.

What is claimed is:

In a control valve having a standard valve stem travel which regulates the flow of limited quantities of fluid therethrough comprising;

(a) a housing having a fluid passage therein,
(b) a transverse partition in said housing dividing said passage into an upstream side and a downstream side,
(c) a seat ring fixedly disposed in said partition means to communicate said upstream side with said downstream side,
(d) said seat ring having a bore therein,
(e) a conical seating surface formed on said seat ring adjacent the upper end of said bore,
(f) said bore having a plurality of axially spaced annular grooves therein,
(g) a valve stem slidably disposed in said housing in substantial axial alignment to the axis of said bore,
(h) actuating means connected to the upper end of said valve stem and adapted to move said valve stem towards and away from seat ring,
(i) a conical tip means formed at the end of said valve stem adjacent said seat ring and having a conical seating surface thereon corresponding to the conical seating surface of said seat ring,
(j) said tip means having an axial bore in the lower end thereof adjacent said seat ring,
(k) a pin disposed in said bore of said tip means,
(l) said pin having a recess in the upper end thereof,
(m) retaining means disposed in said recess to connect said pin to said tip means to permit said valve stem to move relative said pin in a direction normal to the axis of said seating means and to prevent separate axial movement of said pin and said valve stem,
(n) said pin having a diameter smaller by the amount of eccentricity of the axis of said valve stem to the axis of said seat ring than the diameter of the bore of said tip means in which it is disposed.
(o) the lower end of said pin being slidably disposed in said bore of said seat ring,
(p) said pin having a diameter substantially a few millionths of an inch smaller than the diameter of said bore of said seat ring whereby sliding is permitted and lateral movement is prevented so that on said valve stem raising or lowering said pin will move along the axis of said ring without binding,
(q) said tip means of said valve stem coacting with said pin and said seat ring in binding-free self alignment therewith and adapted to seat said seating surface of said tip means on said seating surface of said seat ring to form a sealed engagement therebetween,
(r) said pin having fluid passage means thereon in operative association with said annular grooves whereby on said tip means unseating from said seat ring the flow of fluid in said valve can be selectively regulated.

References Cited in the file of this patent

UNITED STATES PATENTS

| | | |
|---|---|---|
| 726,395 | Bedworth | Apr. 28, 1903 |
| 1,801,959 | Hopkins | Apr. 21, 1931 |
| 1,806,565 | Russel | May 19, 1931 |
| 2,670,008 | Kopp | Feb. 23, 1954 |
| 2,899,980 | Loebel | Aug. 18, 1959 |

FOREIGN PATENTS

| | | |
|---|---|---|
| 832,227 | Germany | Feb. 21, 1952 |
| 1,126,735 | France | July 30, 1956 |